(12) United States Patent
Duus et al.

(10) Patent No.: US 8,894,149 B2
(45) Date of Patent: Nov. 25, 2014

(54) PASSENGER SEAT SYSTEM (71) Applicant: Airbus Operations GmbH, Hamburg (DE)

(72) Inventors: Benjamin Duus, Hamburg (DE); Hans-Gerhard Giesa, Hamburg (DE); Joerg Cremers, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/851,539

(22) Filed: Mar. 27, 2013

(65) Prior Publication Data
US 2013/0234486 A1     Sep. 12, 2013

Related U.S. Application Data (63) Continuation of application No. PCT/EP2011/004780, filed on Sep. 23, 2011.

(60) Provisional application No. 61/387,500, filed on Sep. 29, 2010.

(30) Foreign Application Priority Data

Sep. 29, 2010  (DE) .................. 10 2010 046 853

(51) Int. Cl.
*B60N 2/02*   (2006.01)
*B64D 11/06*  (2006.01)
*B60N 2/30*   (2006.01)
*B60N 2/46*   (2006.01)

(52) U.S. Cl.
CPC .............. *B64D 11/06* (2013.01); *B60N 2/0284* (2013.01); *B60N 2205/30* (2013.01); *B60N 2/3045* (2013.01); *B64D 2011/0624* (2013.01); *B60N 2/4606* (2013.01); *B60N 2/3065* (2013.01); *B60N 2/3056* (2013.01)
USPC ........................ 297/284.11; 297/118; 297/311

(58) Field of Classification Search
CPC .. A47C 1/023; B60N 2/0284; B60N 2205/30; A47D 11/02; B64D 11/06
USPC ........................ 297/118, 284.11, 312, 411.35
See application file for complete search history.

(56) References Cited

U.S. PATENT DOCUMENTS 2,722,268 A     11/1955  Green
4,496,190 A *   1/1985   Barley ..................... 297/411.38
(Continued)

FOREIGN PATENT DOCUMENTS

DE    198 42 825    3/2000
DE    101 28 309    10/2002
(Continued)

OTHER PUBLICATIONS

International Search Report dated Mar. 19, 2012.

*Primary Examiner* — Sarah B McPartlin
(74) *Attorney, Agent, or Firm* — Dickinson Wright PLLC (57) ABSTRACT

A passenger seat system includes a backrest and a seat, which has a first sub-portion having a first surface and a second, opposite surface to the first surface as well as a second sub-portion having a first surface and a second, opposite surface to the first surface. The sub-portions are relatively movable in order to provide first and second operating positions. In the first operating position the sub-portions are positioned in relation to the backrest one behind the other such that the first surface of the first sub-portion and the first surface of the second sub-portion form a usable total seat surface. In the second operating position the sub-portions are positioned in relation to the backrest one above the other such that one of the surfaces of the first sub-portion or the first surface of the second sub-portion forms a usable partial seat surface.

10 Claims, 7 Drawing Sheets

(56) References Cited

U.S. PATENT DOCUMENTS

| | | | | |
|---|---|---|---|---|
| 4,518,203 A | * | 5/1985 | White | 297/452.16 |
| 4,541,669 A | * | 9/1985 | Goldner | 297/284.11 |
| 4,747,639 A | * | 5/1988 | Pfau | 297/219.1 |
| 4,905,330 A | * | 3/1990 | Jacobs | 5/705 |
| 5,169,207 A | * | 12/1992 | Rye | 297/411.33 |
| 6,109,686 A | * | 8/2000 | Fox | 297/105 |
| 6,499,866 B1 | | 12/2002 | Logan | |
| 7,004,542 B2 | * | 2/2006 | Saint-Jalmes | 297/284.11 |
| 7,387,342 B1 | | 6/2008 | Clough | |
| 7,946,972 B2 | * | 5/2011 | Guissin et al. | 482/142 |
| 2005/0062324 A1 | | 3/2005 | Shimasaki | |

FOREIGN PATENT DOCUMENTS

| | | |
|---|---|---|
| DE | 202 00 703 | 6/2003 |
| DE | 10 2008 053 140 | 6/2010 |
| EP | 0625444 | 11/1994 |
| FR | 2 692 209 | 12/1993 |

\* cited by examiner

PASSENGER SEAT SYSTEM

CROSS REFERENCE TO RELATED APPLICATIONS

This application is bypass continuation of PCT/EP2011/004780 filed Sep. 23, 2011 which is entitled to and claims the benefit of German Application No. DE 10 2010 046 853.3 filed Sep. 29, 2010 and US Provisional Application No. 61/387,500, filed Sep. 29, 2010, the disclosures of each of which, including the specification, claims, drawings and abstract, are incorporated herein by reference in their entirety.

FIELD

The invention relates to a passenger seat system that is suitable for use in the passenger cabin of an aircraft but also for use in other means of transport, such as for example buses or trains.

BACKGROUND

In modern means of transport, particularly in aircraft, optimum utilization of the space available in a passenger cabin is of great economic importance. In order to be able to equip the passenger cabin with as many passenger seats as possible, attempts are being made to reduce the volume of the seats, in particular the thickness of the backrests of the seats. Furthermore, particularly in economy class, seat rows disposed one behind the other are being positioned the smallest possible distances apart from one another. Passengers in seat rows disposed a small distance behind one another have little opportunity of varying their sitting position during the flight. This may result in impaired comfort.

A further consequence of the small distances between seat rows is that a passenger sitting in an aisle seat cannot remain in his seat if a passenger sitting in a window seat would like to stand up during the flight or, for example upon entering the aircraft, would like to reach his seat situated next to the window. Rather, the passenger sitting in an aisle seat has to leave his seat and step out into the aisle. This is tedious and troublesome not only for the passengers but also for the cabin crew, whose work is hindered by passengers standing in the aisle. The fact that not all of the seats in the passenger cabin are directly accessible moreover prolongs the embarkation- and disembarkation cycles. Finally, seat rows disposed small distances apart from one another make it difficult to clean the passenger cabin of the aircraft.

From US 2003/0226934 A1 an aircraft seat is known, comprising a seat surface that is subdivided into a rear sub-portion adjoining a backrest of the seat as well as a front sub-portion remote from the backrest of the seat. A pneumatic drive system is used to adjust the sub-portions of the seat surface relative to one another. In a first position the sub-portions of the seat surface are disposed substantially in one plane, thereby forming a correspondingly large usable total seat surface. In a second position, on the other hand, the front sub-portion of the seat surface is positioned in such a way that its underside faces an underside of the rear sub-portion and forms an angle of ca. 45° with the underside of the second sub-portion. A shortening of the total seat surface is therefore realized, so that a passenger is able to stand in front of his seat.

With the aid of the aircraft seat known from US 2003/0226934 A1 some of the problems described above may be eliminated. In particular, the seat allows a passenger to stand in front of his seat, without having to leave his seat row and step out into the aisle. Cleaning of the aircraft cabin is moreover facilitated. The pneumatic adjustment mechanism described in US 2003/0226934 A1 is however comparatively complex and consequently high-maintenance. Furthermore, the seat is not usable when the first sub-portion of the seat surface is situated in its folded-down position.

SUMMARY

The underlying object of the invention is to provide a passenger seat system that not only enables optimum utilization of the space available in the passenger cabin of an aircraft or some other means of transport but also, by virtue of the option of a variation of the sitting position, increases the sitting comfort of the passengers.

This object is achieved by a passenger seat system having features of attached claims.

The passenger seat system according to the invention comprises a backrest as well as a seat. The backrest is preferably pivotable relative to the seat between an upright position and a reclined position. The seat of the passenger seat system comprises a first sub-portion remote from the backrest that has a first surface as well as a second, opposite surface to the first surface. The seat further comprises a second sub-portion facing the backrest that likewise has a first surface as well as a second, opposite surface to the first surface. The first sub-portion and the second sub-portion are movable relative to one another in order to adjust the seat between a first and a second operating position. To enable an adjustment of the seat between a first and a second operating position, both sub-portions of the seat may be movable. For example, both sub-portions of the seat may be connected movably to a base arrangement of the passenger seat system that carries the seat. As an alternative to this, a configuration is however conceivable, in which one of the two sub-portions is mounted rigidly, for example on the base arrangement of the passenger seat system that carries the seat, and the other sub-portion is movable relative to the rigidly fixed sub-portion. If the seat of the passenger seat system according to the invention comprises only one movable sub-portion, it is preferably the first sub-portion that is of a movable configuration.

In the first operating position of the seat the first sub-portion and the second sub-portion are positioned in relation to the backrest one behind the other in such a way that the first surface of the first sub-portion and the first surface of the second sub-portion form a usable total seat surface. In the first operating position of the seat the second sub-portion may for example adjoin the backrest and the first sub-portion may be separated from the backrest by the second sub-portion. In the first operating position of the seat the first surface of the first sub-portion and the first surface of the second sub-portion are preferably disposed substantially parallel to one another and in one plane. It is self-evident that a slight parallel misalignment and/or a slight angular misalignment of the first surface of the first sub-portion and the first surface of the second sub-portion relative to one another is/are possible, which may be tolerance-related or intentional for example for ergonomic reasons.

In the second operating position of the seat, on the other hand, the first sub-portion and the second sub-portion are positioned in relation to the backrest one above the other in such a way that one of the surfaces of the first sub-portion or one of the surfaces of the second sub-portion forms a usable partial seat surface. In the second operating position of the seat the first sub-portion is therefore positioned in relation to a longitudinal axis of the backrest either above or below the second sub-portion, with the result that the usable seat surface of the seat is reduced. Thus, if the passenger seat system according to the invention is integrated into seat rows disposed one behind the other, such as are to be found for example in the passenger cabin of an aircraft, then by virtue of the adjustment of the seat from the first operating position into the second operating position thereof the free space available between the passenger seat system and a seat row disposed in front of the passenger seat system is increased. This naturally applies also if the passenger seat system according to the invention is positioned behind a boundary, for example a dividing wall or the like.

When the seat of the passenger seat system according to the invention is situated in its second operating position, a passenger is able to stand comfortably in front of the passenger seat system. Given use of the passenger seat system according to the invention in a means of transport, for example a train, a bus or an aircraft, this prevents the passenger having to leave his seat row and step into the aisle if for example it is necessary to allow a passenger sitting on an adjacent passenger seat system to gain access to his seat or to leave his seat. It is therefore possible to shorten the embarkation- and disembarkation cycles, the length of which particularly when operating large commercial aircraft has a huge influence on the operating costs of the aircraft. Cleaning of the passenger cabin is moreover facilitated when the seat of the passenger seat system according to the invention is situated in its second operating position.

A further substantial advantage of the passenger seat system according to the invention is that the passenger seat system is usable also when the seat is situated in its second operating position. In other words, a passenger sitting on the passenger seat system according to the invention may choose whether he would like to use the seat of the passenger seat system in the first operating position or in the second operating position thereof. The passenger may therefore, if need be, alter his sitting position, with the result that it is possible to relieve muscle groups that are strained by prolonged sitting. Furthermore, when the seat is situated in its second operating position, the passenger seat system offers more legroom. The passenger seat system with a seat situated in the second operating position thereof is moreover eminently suitable for use as a child seat with a partial seat surface that is shortened compared to the total seat surface. Given use of the passenger seat system according to the invention in a means of transport, such as for example an aircraft, a train or a bus, it is therefore easily possible to provide any desired number of child seats without having to bring additional modules on board for this purpose.

When the passenger seat system according to the invention is intended for use in an aircraft, the passenger seat system preferably is adapted to be used with the seat in its second operating position also during take-off and/or landing. A passenger during take-off and/or landing may sit on the seat in its second operating position or stand in front of the seat in its second operating position. To meet any required safety standards, the passenger seat system then may be equipped with a suitable seatbelt system, i.e. a seatbelt system which may be used by a passenger sitting on the seat in its second operating position or standing in front of the seat in its second operating position. The seatbelt of the seatbelt system may for example be longer than a conventional seatbelt so as to allow the use of the seatbelt also by a passenger standing in front of the seat in its second operating position.

According to a first embodiment of the passenger seat system according to the invention, the first sub-portion or the second sub-portion is movable in relation to the backrest upwards or downwards, i.e. along the longitudinal axis of the backrest. The passenger seat system is moreover configured in such a way that the first sub-portion then is displaceable substantially parallel to the second sub-portion in the direction of the backrest. For adjustment of the seat from the first operating position into the second operating position thereof, for example in a first step the first sub-portion may be moved relative to the second sub-portion upwards in relation to the backrest and the first sub-portion may then be displaced substantially parallel to the second sub-portion in the direction of the backrest. When the seat is situated in its second operating position, the first sub-portion is then disposed in relation to the backrest above the second sub-portion, wherein the first surface of the first sub-portion forms the partial seat surface and the second surface of the first sub-portion is facing the first surface of the second sub-portion and/or rests on the first surface of the second sub-portion.

Alternatively, for adjustment of the seat from the first operating position into the second operating position thereof, the second sub-portion may be moved relative to the first sub-portion downwards in relation to the backrest and the first sub-portion may then be displaced substantially parallel to the second sub-portion in the direction of the backrest. Such an adjustment of the seat likewise results in a seat configuration, in which the first sub-portion is disposed in relation to the backrest above the second sub-portion and the first surface of the first sub-portion forms the usable partial seat surface.

As an alternative thereto, the adjustment of the seat from the first operating position into the second operating position thereof may be effected in such a way that in a first step the first sub-portion is lowered relative to the second sub-portion downwards in relation to the backrest and then the first sub-portion is displaced substantially parallel to the second sub-portion in the direction of the backrest. When the seat is situated in its second operating position, the first sub-portion is then disposed in relation to the backrest underneath the second sub-portion, i.e. the first surface of the second sub-portion forms the usable partial seat surface, while the first surface of the first sub-portion is facing the second surface of the second sub-portion and/or lies adjacent to the second surface of the second sub-portion.

Finally, a design of the seat is conceivable, in which for adjustment of the seat from the first operating position into the second operating position thereof in a first step the second sub-portion is moved relative to the first sub-portion upwards in relation to the backrest and then the first sub-portion is displaced substantially parallel to the second sub-portion in the direction of the backrest. The result of this adjustment movement of the first and the second sub-portion of the seat is likewise a seat configuration, in which the second sub-portion is disposed in relation to the backrest above the first sub-portion and the first surface of the second sub-portion forms the usable partial seat surface.

If desired, the previously described adjustment mechanisms may also be combined. For example, a seat configuration is conceivable, in which the first sub-portion is selectively in a first step movable relative to the second sub-portion upwards or downwards in relation to the backrest and then displaceable substantially parallel to the second sub-portion in the direction of the backrest. In this way it is possible to realize various seat heights of the seat situated in the second operating position thereof. It is self-evident that such a combination of the previously described adjustment mechanisms is possible also with a seat configuration, in which the seat in its second operating position has a second sub-portion that is disposed in relation to the backrest above the first sub-portion.

In a particularly simply designed embodiment of the passenger seat system according to the invention, the first sub-portion is pivotable relative to the second sub-portion upwards or downwards in relation to the backrest. With such a development of the seat of the passenger seat system it takes only one continuous movement of the first sub-portion to adjust the seat between the first operating position and the second operating position thereof. If the seat is configured in such a way that, for adjustment of the seat from the first operating position into the second operating position thereof, the first sub-portion is pivoted upwards in relation to the backrest, the first sub-portion in the second operating position of the seat is disposed in relation to the backrest above the second sub-portion. The usable partial seat surface is then however formed by the second surface of the first sub-portion. The first surface of the first sub-portion that in the first operating position of the seat forms part of the usable total seat surface is, on the other hand, facing the first surface of the second sub-portion and/or rests on the first surface of the second sub-portion.

Given a configuration of the seat, in which the adjustment of the seat from the first operating position into the second operating position thereof is effected by pivoting the first sub-portion relative to the second sub-portion downwards in relation to the backrest, the first sub-portion in the second operating position of the seat is, on the other hand, disposed in relation to the backrest below the second sub-portion. The usable partial seat surface is then formed by the first surface of the second sub-portion, while the second surface of the first sub-portion is facing the second surface of the second sub-portion and/or lies adjacent to the second surface of the second sub-portion.

A swivel mechanism for pivoting the first sub-portion relative to the second sub-portion may comprise a swivel lever, which is connected to the first sub-portion and pivotable about an axis relative to the second sub-portion. The axis may be for example connected to the second sub-portion or mounted on a base arrangement of the seat system that carries the seat. As an alternative thereto, a swivel mechanism is conceivable, which comprises a first swivel lever connected to the first sub-portion as well as a second swivel lever connected to the second sub-portion. The first and the second swivel lever may then be pivotable relative to one another about an axis. A swivel mechanism is of a comparatively simple construction and is therefore lightweight and requires little maintenance.

Particularly if the passenger seat system according to the invention is equipped with a seat, in which in the second operating position of the seat the second surface of the first sub-portion forms the usable partial seat surface, the first sub-portion of the seat is preferably provided with a seat cushion both in the region of its first surface and in the region of its second surface. Given such a development of the first sub-portion, then in accordance with requirements the first or the second surface of the first sub-portion may be used to form part of the usable total seat surface or to form the usable partial seat surface.

In a simply designed, economical and low-maintenance embodiment of the passenger seat system according to the invention, the seat of the passenger seat system is adjustable manually between its first and its second operating position. However, as an alternative thereto the passenger seat system may be provided with a drive mechanism that is adapted to adjust the seat between the first and the second operating position thereof. The drive mechanism may be configured in the form of an electric, pneumatic, hydraulic or other suitable mechanism and, if need be, with appropriate gears for converting a drive motion of a drive device, for example of an electric motor or a pneumatic or hydraulic cylinder, to the adjustment motion(s) of a sub-portion or sub-portions of the seat. A passenger seat system provided with a drive mechanism is very comfortable and easy to operate.

The passenger seat system according to the invention may further comprise a locking mechanism that is adapted to lock the seat in the first and/or the second operating position thereof. For example, the locking mechanism may be configured in the form of a blocking mechanism that is adapted to block a swivel mechanism for pivoting the first sub-portion relative to the second sub-portion and hence to prevent the pivoting motion of the first sub-portion relative to the second sub-portion. A locking mechanism may prevent the seat from being unintentionally moved out of its operating position.

The passenger seat system according to the invention may further be provided with a biasing mechanism that is adapted to bias the seat into the first and/or the second operating position thereof. The biasing mechanism is preferably adapted to bias the seat into the second operating position thereof. The biasing mechanism may be configured for example in the form of a spring that pushes the seat into the second operating position thereof. In a passenger seat system that is equipped with a biasing mechanism, the seat is automatically moved into its second operating position if a locking mechanism that holds the seat in the first operating position thereof is released or if a passenger sitting on the seat simply stands up.

The passenger seat system according to the invention preferably further comprises at least one armrest that is positionable in various positions along the longitudinal axis of the backrest. An armrest that is adjustable in height in this way allows an adaptation of the armrest position to the operating position of the seat that is particularly advantageous if the adjustment of the seat between the first and the second operating position thereof leads to a variation of the seat height. The height-adjustable armrest naturally also allows, independently of a variation of the seat position, the adaptation of the armrest position to different elbow heights of passengers. If desired, a mechanism for adjusting the seat may be coupled in such a way to a mechanism for adjusting the armrest that upon a variation of the seat position a simultaneous adjustment of the armrest automatically occurs. In a preferred embodiment the passenger seat system according to the invention is equipped with two armrests.

The armrest may comprise an arm support, which is fastened by a fastening device to the passenger seat system, for example to the backrest, the seat or a base arrangement that carries the seat. The fastening device is preferably displaceable relative to a receiving device and lockable in various positions in the receiving device. The fastening device may comprise for example a fastening rod that is fixable in various positions in a receiving sleeve.

In addition or as an alternative thereto, the arm support of the armrest may comprise a first portion and a second portion. The first portion of the armrest is preferably pivotable about a first axis relative to the second portion of the armrest. The second portion of the armrest may moreover be pivotable about a second axis relative to the fastening device for fastening the arm support to the passenger seat system. An armrest configured in this way is not only adjustable in height but also comprises an arm support that is adjustable in length. As a result, the accessibility of the seat row is guaranteed.

The passenger seat system preferably further comprises a headrest that may be positioned in various positions along the longitudinal axis of the backrest. Equipping the passenger seat system according to the invention with an adjustable headrest is appropriate particularly if the passenger seat system comprises a seat, the adjustment between the first and the second operating position of which leads to a variation of the seat height.

The first sub-portion and/or the second sub-portion of the seat may be provided with at least one seat cushion that contains fibres, which are integrated into a matrix of a binding material, and/or woven fibres. For example, the seat cushion may contain coconut fibres integrated into a matrix of natural latex and/or a cover of woven fibres. Compared to a conventional foam material seat cushion a seat cushion of such a design reduces the pressure load on the bottom of a passenger sitting on the seat. The seat cushion is moreover notable for high air- and moisture permeability and good heat removal properties and therefore also increases thermal comfort, A seat cushion may be connected releasably to an under-structure of the first sub-portion and/or of the second sub-portion so that the seat cushion is detachable from the under-structure of the first sub-portion and/or of the second sub-portion.

Finally, the passenger seat system according to the invention may comprise a belt, which is adjustable in length and the length of which is so selected that the belt is capable of securing a passenger in his position on the seat of the passenger seat system, independently of whether the seat of the passenger seat system is situated in its first or its second operating position. In particular, the length of the belt may be selected so as to allow the use of the belt also when a passenger is standing in front of the seat in its second operating position.

The passenger seat system according to the invention is particularly suitable for use in a means of transport, such as for example a train, a bus or an aircraft.

BRIEF DESCRIPTION OF DRAWINGS

There now follows a detailed description of preferred embodiments of the invention with reference to the accompanying schematic drawings, which show in FIGS. 1a-1c the operating principle of a first embodiment of a passenger seat system, FIGS. 2a-2c the operating principle of a second embodiment of a passenger seat system, FIGS. 3a-3c the operating principle of a third embodiment of a passenger seat system, FIGS. 4a-4c the operating principle of a fourth embodiment of a passenger seat system, FIGS. 5a and 5b the operating principle of a fifth embodiment of a passenger seat system, FIGS. 6a and 6b the operating principle of a sixth embodiment of a passenger seat system, FIG. 7 the passenger seat system according to FIGS. 5a and 5b in a fitted state in an aircraft passenger cabin, FIGS. 8a and 8b details of a swivel mechanism for adjusting the seat of the passenger seat system according to FIGS. 5a and 5b between a first operating position and a second operating position, FIGS. 9a-9c a first embodiment of an armrest suitable for use in the passenger seat system, and FIGS. 10a-10c a second embodiment of an armrest suitable for use in the aircraft passenger seat system.

DETAILED DESCRIPTION

A passenger seat system 10 that is suitable for use in a means of transport, in particular in an aircraft, comprises a backrest 12 and a seat 14. The backrest 12 is pivotable relative to the seat 14 between an upright position and a reclined position. The seat 14 comprises a first sub-portion 16, which has a first surface 18 as well as a second, opposite surface 20 to the first surface 18. The seat 14 further comprises a second sub-portion 22, which has a first surface 24 as well as a second, opposite surface 26 to the first surface 24. As is described in detail below, the first sub-portion 16 and the second sub-portion 22 are movable relative to one another in order to adjust the seat 14 between a first operating position, which is represented in FIGS. 1a, 2a, 3a, 4a, 5a and 6a, and a second operating position, which is represented in FIGS. 1c, 2c, 3c, 4c, 5b and 6b.

In the first operating position of the seat 14 the first sub-portion 16 and the second sub-portion 22 are positioned in relation to the backrest 12 one behind the other, i.e. the first sub-portion 16 is separated from the backrest 12 by the second sub-portion 22. As a result, the first surface 18 of the first sub-portion 16 and the first surface 24 of the second sub-portion 22 form a usable total seat surface, on which a passenger may sit. In the second operating position of the seat 14, on the other hand, the first sub-portion 16 and the second sub-portion 22 are positioned in relation to the backrest 12 one above the other, so that either the first surface 18 or the second surface 20 of the first sub-portion 16 or the first surface 24 of the second sub-portion 22 forms a usable partial seat surface, on which a passenger may likewise sit.

Figure 1:
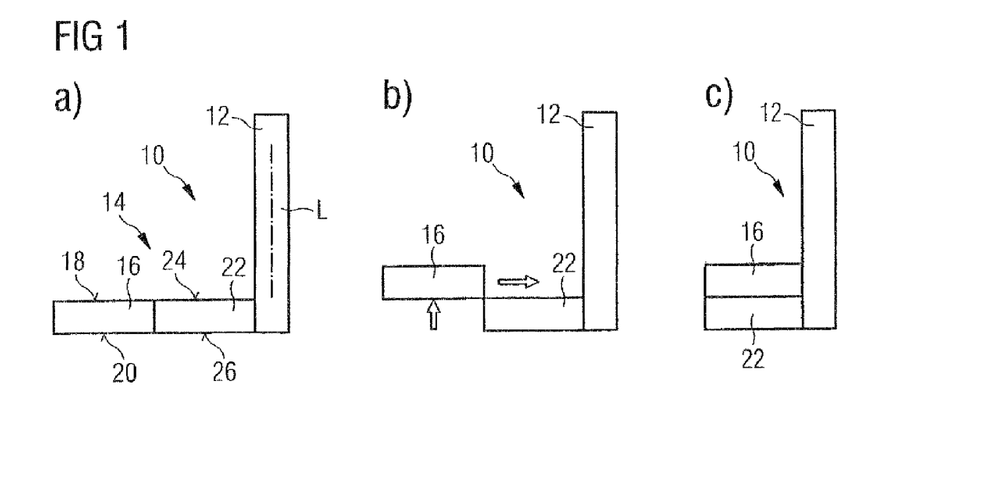

In the embodiment of the passenger seat system 10 represented in FIGS. 1a-1c, the seat 14 may be adjusted from its first operating position into its second operating position in that in a first step the first sub-portion 16 is initially moved relative to the second sub-portion 22 along a longitudinal axis L of the backrest 12 and then the first sub-portion 16 displaced parallel to the second sub-portion 22 in the direction of the backrest 12. Thus, in the second operating position of the seat 14 the usable partial seat surface is formed by the first surface 18 of the first sub-portion 16. The second surface 20 of the first sub-portion 16, on the other hand, rests on the first surface 24 of the second sub-portion 22. A comparison of FIGS. 1a and 1c reveals that the seat 14 in its second operating position is in a raised position relative to the backrest 12, i.e. the usable partial seat surface in the second operating position of the seat 14 is higher than the usable total seat surface of the seat 14 in the first operating position of the seat.

Figure 2:
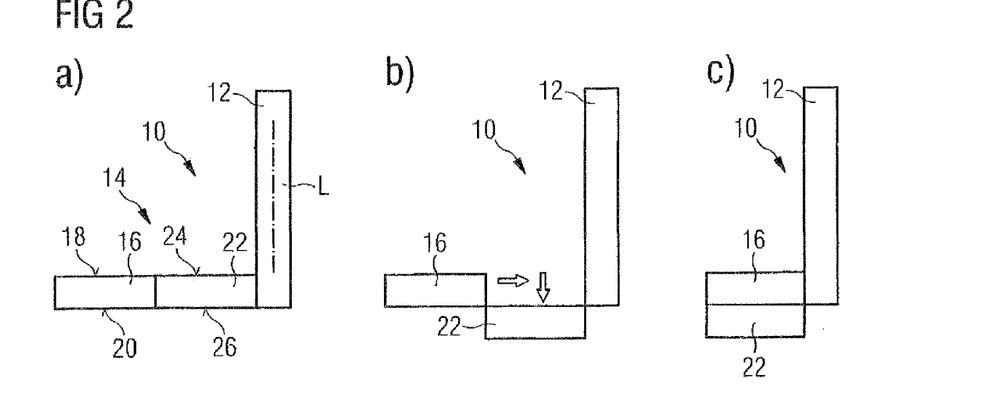

In the embodiment of the passenger seat system 10 represented in FIGS. 2a-2c, on the other hand, the adjustment of the seat 14 from the first operating position into the second operating position thereof is effected in that in a first step the second sub-portion 22 is initially moved relative to the first sub-portion 16 down along the longitudinal axis L of the backrest 12, In a second step the first sub-portion 16 is displaced parallel to the second sub-portion 22 in the direction of the backrest 12, with the result that once again the second surface 20 of the first sub-portion 16 comes to lie adjacent to the first surface 24 of the second sub-portion 22 and the usable partial seat surface is formed by the first surface 18 of the first sub-portion 16. Unlike in the arrangement shown in FIGS. 1a, 1b and 1c, the usable partial seat surface formed by the first surface 18 of the first sub-portion 16 is however not situated in a raised position compared to the usable total seat surface formed in the first operating position of the seat 14 by the first surface 18 of the first sub-portion 16 and the first surface 24 of the second sub-portion 22.

Figure 3:
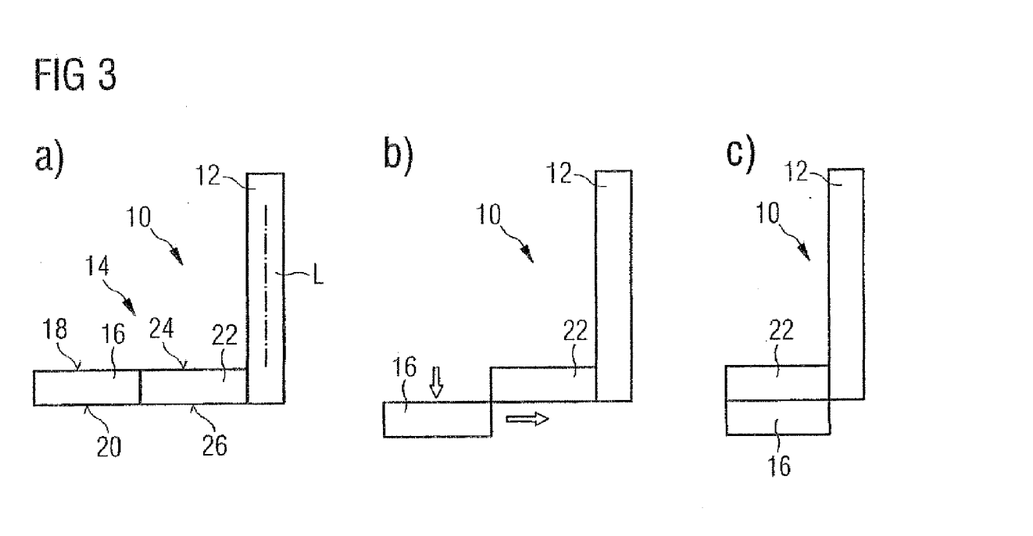

FIGS. 3a-3c show an embodiment of the passenger seat system 10, in which an adjustment of the seat 14 from the first operating position into the second operating position thereof is effected by lowering of the first sub-portion 16 relative to the second sub-portion 22 and then parallel displacement of the first sub-portion 16 relative to the second sub-portion 22 in the direction of the backrest 12. The first sub-portion 16 therefore moves in relation to the backrest 12 into a position disposed below the second sub-portion 22, i.e. the first surface 18 of the first sub-portion 16 comes to lie adjacent to the second surface 26 of the second sub-portion 22 and the usable partial seat surface is formed by the first surface 24 of the second sub-portion 22. A height variation of the usable partial seat surface compared to the usable total seat surface does not occur.

Figure 4:
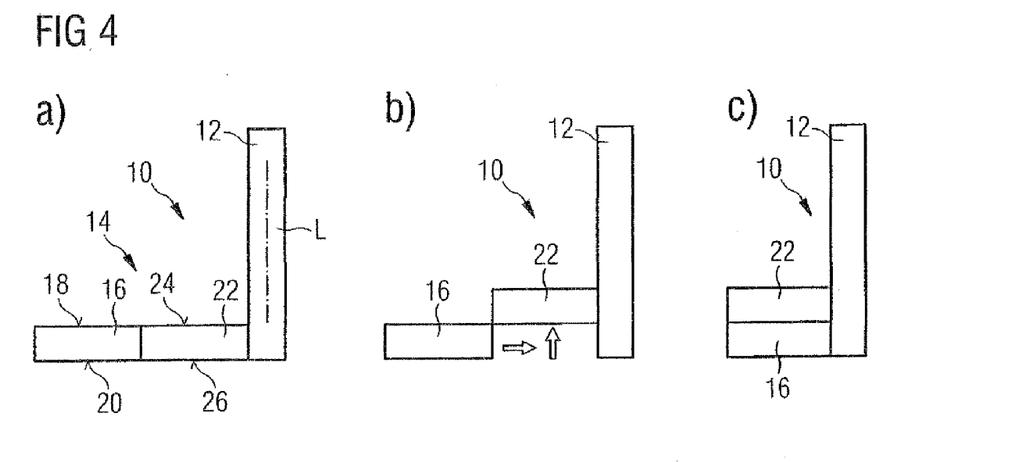

Finally, FIGS. 4a-4c show a configuration of the passenger seat system 10, in which for adjustment of the seat 14 from the first operating position into the second operating position thereof the second sub-portion 22 is initially moved relative to the first sub-portion 16 up along the longitudinal axis L of the backrest 12 and then the first sub-portion 16 is displaced parallel to the second sub-portion 22 in the direction of the backrest 12. In this case, the first surface 18 of the first sub-portion 16 once again comes to lie adjacent to the second surface 26 of the second sub-portion 22 and the usable partial seat surface is formed by the first surface 24 of the second sub-portion 22. Unlike in the arrangement shown in FIGS. 3a-3c, a variation of the seat height does however occur, i.e. in relation to the backrest 12 the usable partial seat surface in the configuration of the passenger seat system 10 according to FIGS. 4a-4c is situated at a greater height than in the arrangement according to FIGS. 3a-3c.

Figure 5:
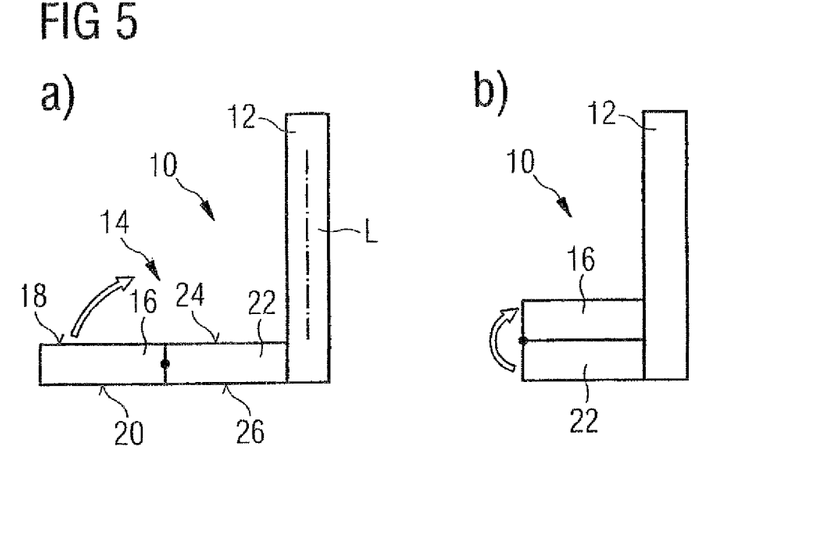

FIGS. 5a and 5b as well as 6a and 6b show in each case configurations of the passenger seat system 10, in which the adjustment of the seat 14 from the first operating position into the second operating position thereof is effected by pivoting the first sub-portion 16 relative to the second sub-portion 22. In the configuration according to FIGS. 5a and 5b, the first sub-portion 16 is pivoted relative to the second sub-portion 22 upwards in relation to the backrest 12, with the result that the first surface 18 of the first sub-portion 16 comes to lie adjacent to the first surface 24 of the second sub-portion 22. The usable partial seat surface is then formed by the second surface 20 of the first sub-portion 16 and is in a raised position compared to the total seat surface formed by the first surface 18 of the first sub-portion 16 and the first surface 24 of the second sub-portion 22.

Figure 6:
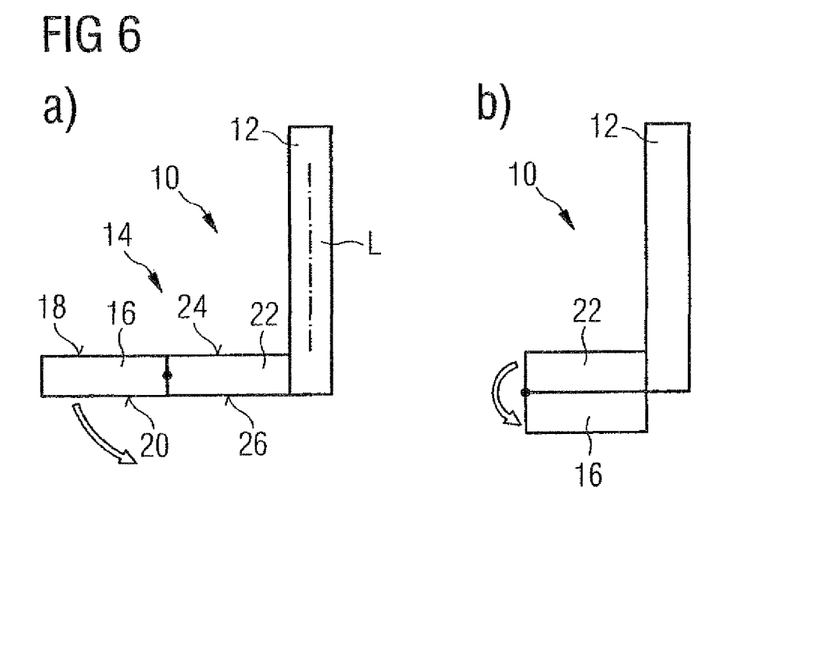

In the configuration according to FIGS. 6a and 6b, on the other hand, the adjustment of the seat 14 from the first operating position into the second operating position thereof is effected by pivoting the first sub-portion 16 relative to the second sub-portion 22 downwards in relation to the backrest 12. As a result, the second surface 20 of the first sub-portion 16 comes to lie adjacent to the second surface 26 of the second sub-portion 22 and the usable partial seat surface is formed by the first surface 24 of the second sub-portion 22. A height variation of the usable partial seat surface compared to the usable total seat surface does not occur.

In the embodiments of the passenger seat system 10 that are shown in the figures the first sub-portion 16 and the second sub-portion 22 of the seat 14 are in each case substantially equal in size. It is however self-evident that this is not absolutely necessary. Rather, the first sub-portion 16 and the second sub-portion 22 may also differ in size, although in order to prevent the formation of a too steeply stepped seat surface the size differences should not be too great.

Figure 7:
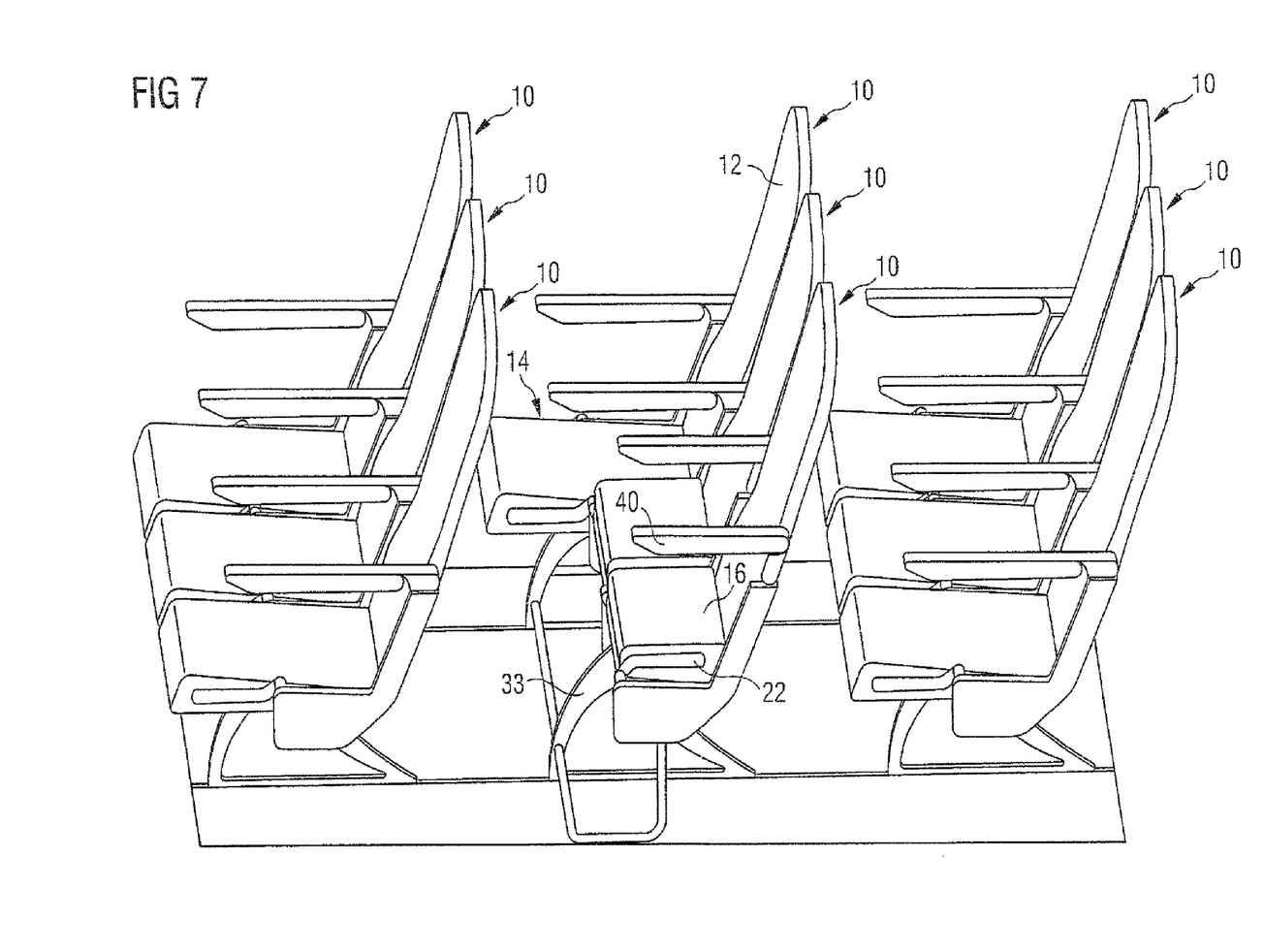

As may best be seen in FIG. 7, which shows the passenger seat system 10 in a fitted state in a passenger cabin of an aircraft, as a result of the adjustment of the seat surface 14 from the first operating position into the second operating position thereof a shortening of the usable seat surface is achieved and leads to a marked increase of the free space between the seat surface and a seat row disposed in front of the passenger seat system 10. A passenger seat system 10 having a seat 14 situated in the second operating position thereof therefore offers a large amount of legroom. A passenger is moreover able to stand up in front of a passenger seat system 10, the seat 14 of which is situated in its second operating position, without having to leave his seat row and step out into the aisle. Finally, the passenger seat system 10, when the seat 14 is situated in its second operating position, is ideal for use as a child seat.

Figure 8:
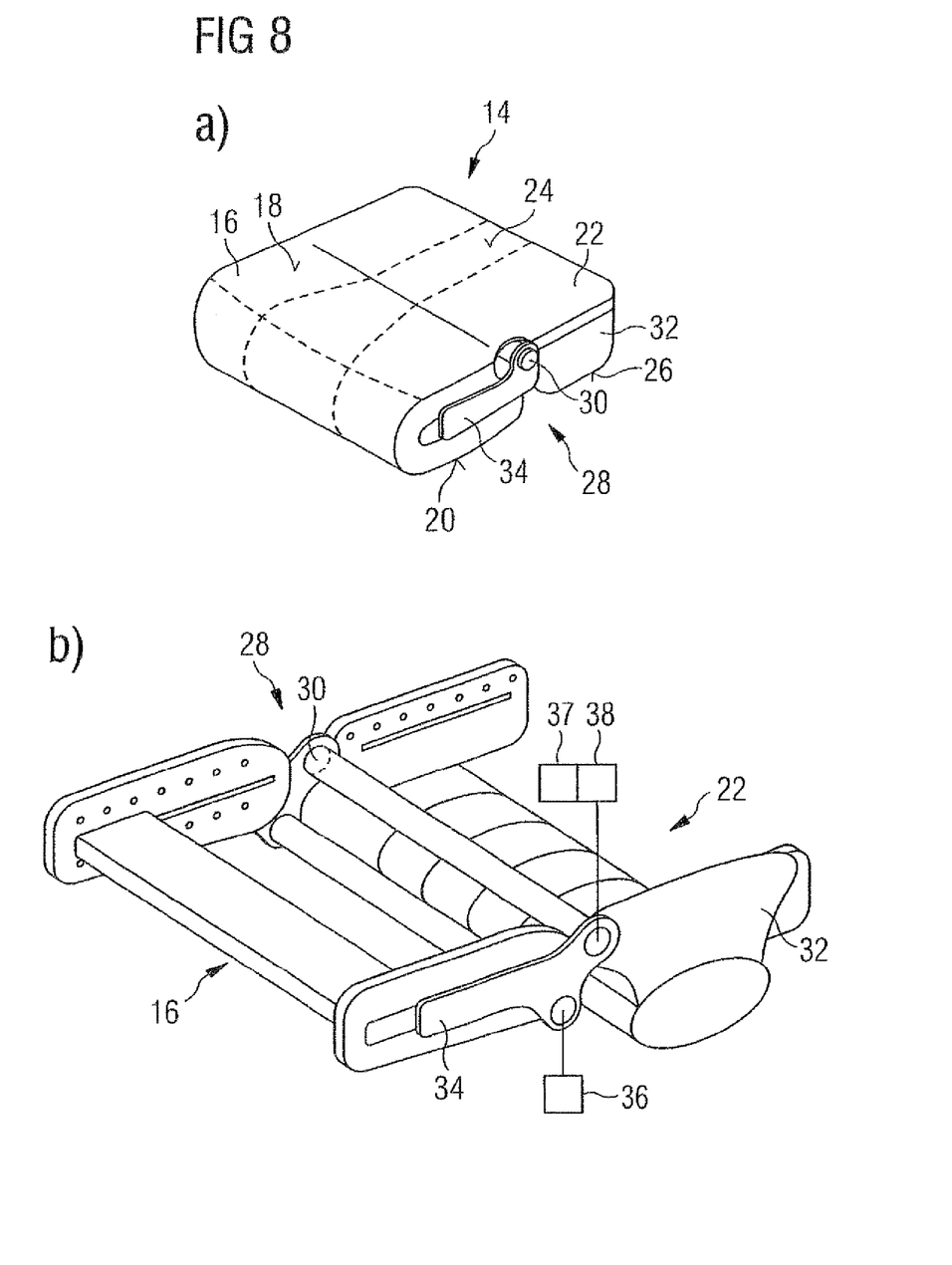
Figure 9:
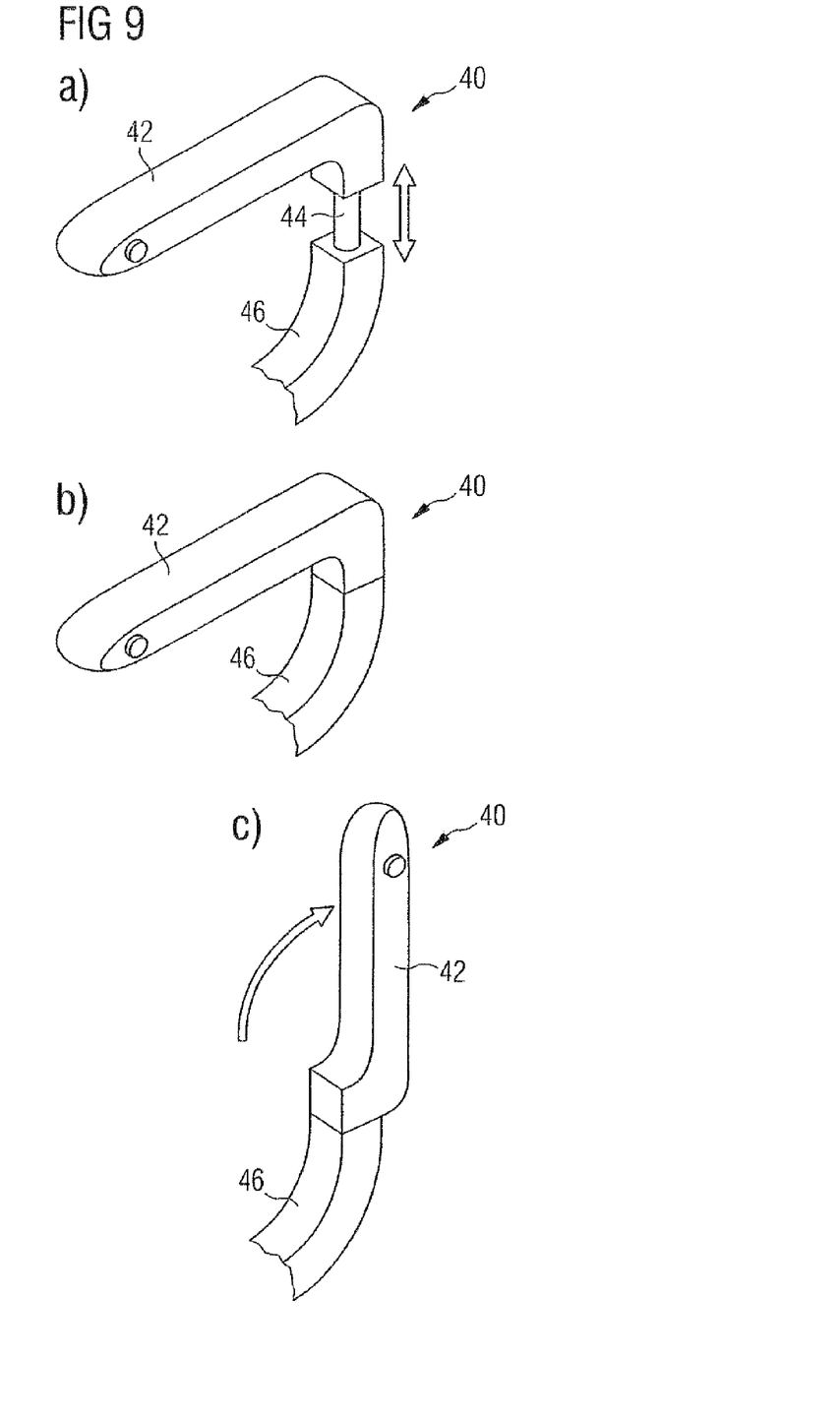

FIGS. 8a and 8b show an embodiment of a swivel mechanism 28 that may be used in a passenger seat system 10 according to FIGS. 5a and 5b to pivot the seat 14 between the first operating position and the second operating position thereof. The swivel mechanism 28 comprises a swivel axis 30 that is supported on a bearing element 32. In the embodiment represented in FIGS. 8a and 8b, the bearing element 32 is connected to the second sub-portion 22 of the seat 14. As an alternative thereto it is however conceivable to support the swivel axis 30 on a base arrangement 33 (cf. FIG. 7) that carries the seat 14 of the passenger seat system 10. The swivel mechanism 28 further comprises a swivel lever 34, which is connected to the first sub-portion 16 and pivotable about the swivel axis 30 relative to the second sub-portion 22. Thus, by pivoting the swivel lever 34 relative to the second sub-portion 22 the first sub-portion 16 may also be pivoted relative to the second sub-portion 22.

As an alternative thereto a swivel mechanism is conceivable, which comprises a first swivel lever connected to the first sub-portion 16 as well as a second swivel lever connected to the second sub-portion 22. Such a mechanism makes it possible to dispense with the swivel axis 30 configured in the form of a rigid tube. All that is required instead is a connecting pin that connects the two swivel levers to one another and extends only in the region of the swivel levers. To enable unimpeded pivoting of the first sub-portion 16 relative to the second sub-portion 22, the connecting pin is disposed at the height of the seat surface plane of the sub-portions 16, 22. By dispensing with a swivel axis 30 configured in the form of a rigid tube it is possible to increase the seat comfort.

As described above, in the configuration of the passenger seat system 10 represented in FIGS. 5a and 5b, in the first operating position of the seat 14 the first surface 18 of the first sub-portion 16 is used to form a portion of the usable total seat surface, while in the second operating position of the seat 14 the second surface 20 of the first sub-portion 16 forms the usable partial seat surface. The first sub-portion 16 is therefore, as may be seen in FIG. 8a, provided with a seat cushion both in the region of its first surface 18 and in the region of its second surface 20. The seat cushions mounted onto the first sub-portion 16, as well as a seat cushion mounted onto the second sub-portion 22 in the region of the first surface 24 thereof, contain fibres that are integrated into a matrix. This material is covered by a cover made of woven fibres. The seat cushions are notable for high air- and moisture permeability and reduce the pressure load on the bottom of a passenger sitting on the seat 14.

The adjustment of the seat 14 between the first operating position and the second operating position thereof may be effected manually. The passenger seat system 10 may however also be provided with a drive mechanism 36, which is represented merely diagrammatically in FIG. 8 and enables an automatic adjustment of the seat 14 between the first and the second operating position thereof. The drive mechanism 36 may be configured for example in the form of an electric motor.

The passenger seat system may further comprise a locking mechanism, which is represented likewise merely diagrammatically in FIG. 8b and is used to lock the seat 14 in the first and/or second operating position thereof. Finally, a biasing mechanism 38 that is indicated likewise merely diagrammatically in FIG. 8b may be provided, which is used to bias the seat 14 into the first and/or the second operating position thereof. The biasing mechanism 38 may be configured for example in the form of a spring or may comprise a spring and be used to bias the seat 14 into the second operating position thereof. The first sub-portion 16 then folds, for example as a result of the initial stress applied by the biasing mechanism 38, automatically over the second sub-portion 22 when the passenger gets up from the seat 14.

The passenger seat system 10 further comprises at least one armrest 40 and, if need be, i.e. depending on the arrangement of the passenger seat system 10 in a seat row, two armrests 40 (see FIG. 7). As is represented in FIGS. 9a-9c and 10a-10c, the armrests 40 may be positioned in various positions along the longitudinal axis L of the backrest 12, i.e. are adjustable in height. In the embodiment represented in FIGS. 9a-9c, the armrest 40 comprises an arm support 42 that is fastened by a fastening device 44 configured in the form of a fastening rod to the passenger seat system 10, for example to the base arrangement 33. The fastening device 44 is accommodated displaceably in a receiving device 46 and is lockable in various positions in the receiving device 46 by means of a suitable locking system. The armrest 40 is moreover adjustable in relation to the backrest 12 between a folded-down position (see FIGS. 9a and 9b) and a folded-up position (see FIG. 9c).

Figure 10:
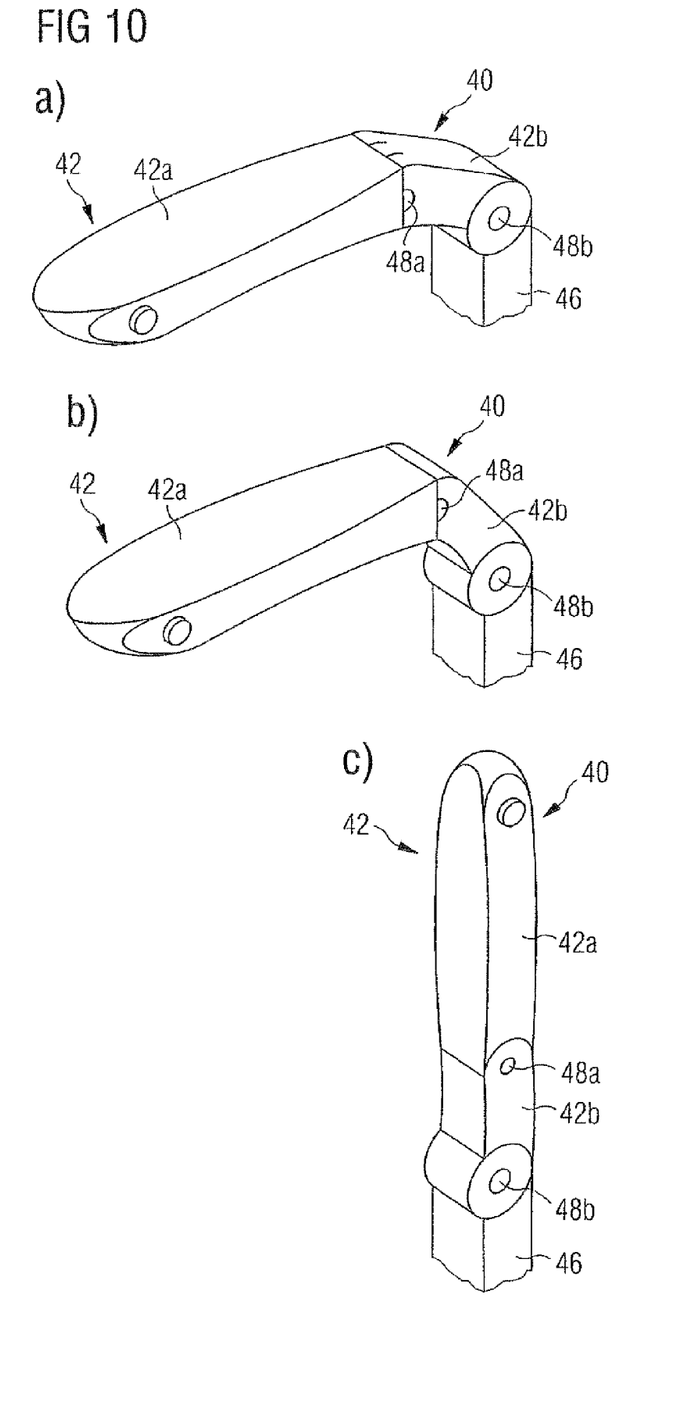

In an embodiment represented in FIGS. 10a-10c, the arm support 42 of the armrest 40 comprises a first portion 42a and a second portion 42b. The first portion 42a is pivotable relative to the second portion 42b about a first axis 48a. The second portion 42b, on the other hand, is pivotable about a second axis 48b relative to the fastening device 44 for fastening the arm support 42 to the passenger seat system 10. As a result, an armrest 40 that is adjustable both in height and length is obtained.

The invention claimed is:

1. Passenger seat system comprising:
    a backrest and
    a seat, which comprises a first sub-portion having a first surface and a second, opposite surface to the first surface as well as a second sub-portion having a first surface and a second, opposite surface to the first surface, wherein the first sub-portion and the second sub-portion are movable relative to one another in order to adjust the seat between a first and a second operating position, and wherein the first sub-portion and the second sub-portion in the first operating position of the seat are positioned in relation to the backrest one behind the other in such a way that the first surface of the first sub-portion and the first surface of the second sub-portion form a usable total seat surface,
    wherein the first sub-portion and the second sub-portion in the second operating position of the seat are positioned in relation to the backrest one above the other in such a way that the first surface of the first sub-portion or the first surface of the second sub-portion forms a usable partial seat surface and the other one of the first surface of the first sub-portion or the other one of the first surface of the second sub-portion does not form a usable partial seat surface,
    wherein the first sub-portion or the second sub-portion is configured to move substantially longitudinally along a longitudinal axis of the backrest to enable the first sub-portion to be displaceable substantially parallel to the second sub-portion in the direction toward the backrest so that, in the second operating position, the second surface opposite the first surface forming a usable partial seat surface of the first or the second sub-portion rests on the first surface of the other sub-portion not forming a usable seat surface.

2. Passenger seat system according to claim 1, wherein the first sub-portion of the seat is provided with a seat cushion both in the region of its first surface and in the region of its second surface.

3. Passenger seat system according to claim 1, further comprising a drive mechanism that is adapted to adjust the seat between the first and the second operating position thereof.

4. Passenger seat system according to claim 1, further comprising a locking mechanism that is adapted to lock the seat in at least one of the first and the second operating position thereof.

5. Passenger seat system according to claim 1, further comprising a biasing mechanism that is adapted to bias the seat into at least one of the first and the second operating position thereof.

6. Passenger seat system according to claim 1, further comprising at least one armrest that is positionable in various positions along the longitudinal axis of the backrest.

7. Passenger seat system according to claim 6, wherein an arm support of the armrest is fastened to the passenger seat system by a fastening device, which is displaceable relative to a receiving device of the passenger seat system and lockable in various positions in the receiving device.

8. Passenger seat system according to claim 7, wherein the arm support of the armrest comprises a first portion and a second portion, wherein the first portion is pivotable about a first axis relative to the second portion and the second portion is pivotable about a second axis relative to the fastening device for fastening the atm support to the passenger seat system.

9. Passenger seat system according to claim 1, wherein at least one of the first sub-portion and the second sub-portion of the seat is provided with at least one seat cushion that contains at least one of fibres, which are integrated into a matrix of a binding material, and woven fibres.

10. Aircraft comprising a passenger seat system according to claim 1.

* * * * *